Oct. 11, 1949.   M. MUSKAT ET AL   2,484,422
METHOD OF DETECTING MUD FILMS
ON EXPOSED ROCK STRATA
Filed Jan. 11, 1945
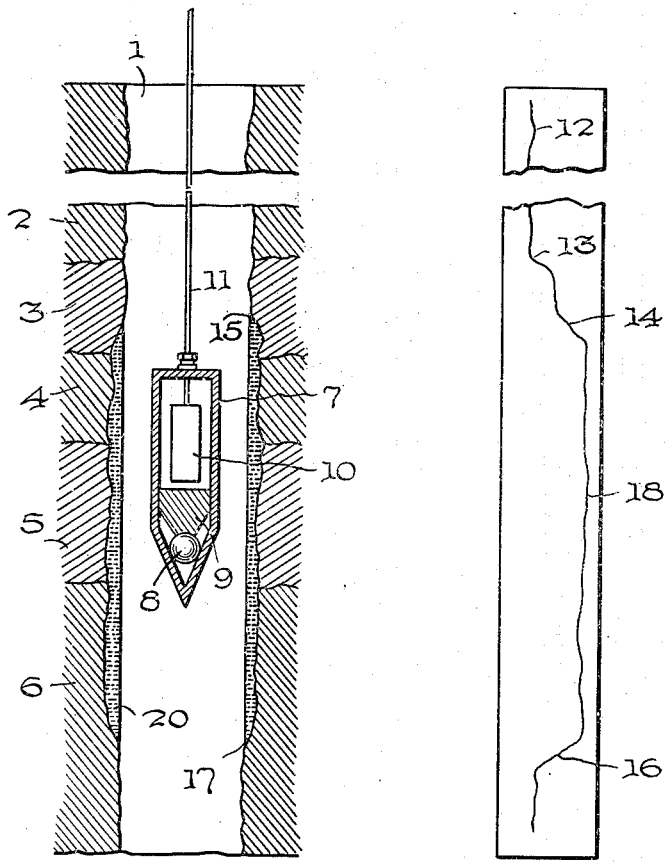
Inventors
MORRIS MUSKAT
NORMAN D. COGGESHALL Patented Oct. 11, 1949

2,484,422

UNITED STATES PATENT OFFICE 2,484,422

METHOD OF DETECTING MUD FILMS ON EXPOSED ROCK STRATA

Morris Muskat, Oakmont, and Norman D. Coggeshall, O'Hara Township, Allegheny County, Pa., assignors to Gulf Research & Development Company, Pittsburgh, Pa., a corporation of Delaware Application January 11, 1945, Serial No. 572,304

4 Claims. (Cl. 250—83.6)

1

This invention concerns a method of detecting the presence of mud films on the walls of a borehole.

One of the most important problems involved in well completions is the removal of the mud film from the exposed faces of producing formations. This mud film, also called mud cake or filter cake, is formed during the course of drilling through the use of mud laden drilling fluids. When the well is put on production, the presence of the mud cake interferes with the flow of oil from the formation into the well. Washing the face of the rock strata is very effective in removing the mud cake in many cases. Chemical cleaners and abrasive methods have also been used to remove mud film. However, in spite of these procedures, the mud film often remains attached to the rock strata. Evidence for this is the fact that the productivity of the well when it is put on production test is often considerably less than that predicted from the permeability analysis of cores taken from the producing formation.

In attempting to remove the mud cake it is sometimes difficult to determine to what extent the mud has been removed. Due to porosity of formations, plastering properties of the mud, and chemical reactions which may take place between connate waters and the mud, it is often found that a hard, thick mud cake has resulted and which is not easily removed. It has been proposed (in U. S. Patent No. 2,339,129) to add radioactive materials to the mud flush before it is used in the drilling operation. The presence of the mud film may then be detected by the gamma ray activity of the radioactive material contained in the mud. Ordinary radioactive minerals, when used for this purpose, seriously interfere with subsequent gamma ray logs made in the well for formation correlation purposes. Artificially radioactivated materials may be used but these have the disadvantage of losing their activation so that they cannot be detected very long after the mud cake has formed and drilling has passed a given level in the well. Furthermore, the preparation of these artificial radioactive materials is one requiring additional equipment and when activated these materials are a danger to personnel handling them and to the personnel engaged in drilling the well.

2

This invention consists in adding to the mud a material which may be activated in the mud cake should any such mud cake remain in place after cleaning operations have been attempted. The method of activation is by bombardment with neutrons and detection is by means of a gamma ray detector, the combination of these two steps being generally known as neutron logging.

It is a primary object of this invention to provide a simple, inexpensive and convenient method of locating any mud film remaining on a formation adjacent to a borehole.

Another object is to provide a method of locating mud film which may be applied to the well at any time.

Another object is to provide a method of locating mud film by the application of neutron logging.

Another object is to determine the thickness of mud cakes formed during the drilling of wells.

Details of the invention and the manner in which these objects are accomplished will be more fully understood by reference to the accompanying drawings in which:

Fig. 1 represents a cross-section of a borehole and apparatus for practicing the invention;

Fig. 2 shows a neutron log curve obtained when using this invention.

Methods and apparatus for neutron logging of wells have been proposed in the literature and in several U. S. patents. These methods generally expose the formations to a bombardment by neutrons and recording either the scattered or reflected neutrons or the gamma rays emitted by the excited nuclei. Certain elements are particularly effective for neutron log identification because of the nature of their nuclear structure. The gamma ray activity is commonly induced in aluminum, chlorine and arsenic by neutron bombardment.

Referring to Fig. 1, numeral 1 indicates a borehole passing through earth formations 2, 3, 4, 5 and 6. Equipment for drilling the well and pumping the mud used in the drilling operation are not shown since they do not constitute a part of this invention. Suspended inside the casing is a neutron logging apparatus contained in outer casing 7. This apparatus contains a source of neutrons 8 which may be a mixture of radium and beryllium. Directly above it is a shield 9 which is composed of a neutron absorbing material such as cadmium or boron which prevents the neutrons from directly reaching detecting element 10. Device 10 consists of a gamma ray indicator and the necessary apparatus for conveying indication of the gamma ray activity to the surface by means of cable 11. When this apparatus is run into the well the neutrons produced by source 8 easily pass through the casing 7 and into the formations. Upon capture by the nuclei of certain elements such as aluminum, chlorine or arsenic, gamma rays are produced which radiate back through the casing into the borehole and are detected by unit 10. Indications of the intensity of the gamma radiation is conducted over cable 11 to the surface where it is recorded by known devices.

In drilling the well the drilling fluid is weighted with a mud whose purpose is to control pressures encountered in the formations, hold the formation face in place to keep it from falling into the hole, and to prevent interchange of fluids. This mud film or mud cake is indicated in Fig. 1 by numeral 20.

In this invention a method is provided for detecting the presence and estimating the amount of mud cake plastered on the walls of the borehole. If the mud film is to be removed the method will serve as an indicator of the effectiveness of such removal and thus serve as a guide for further cleaning processes. In the practice of this invention a material is added to the mud which may be easily activated in the well to gamma ray activity by neutron bombardment. Such materials are aluminum or chlorine or arsenic or compounds of them or mixtures of such compounds. Mud containing these elements in sufficiently large concentration will register as a high value on a neutron log obtained by means of the apparatus of Fig. 1. Each of these elements will give sufficient gamma rays of more than 2 m. e. v. energy when bombarded with neutrons. If the mud already possesses one or more of these agents in sufficient concentration to show up stronger on the neutron log against the effect of the logged strata themselves, no more need be added. An analysis of the composition of the natural mud material and of the type of rock strata anticipated in the drilling will indicate the type of element to be added. Different materials require more or less time to reach an equilibrium value of gamma ray activity in the presence of an inducing neutron radiation. The nature of the adjacent strata and their connate fluids will indicate the choice and amount of material to be added to the mud. Since the concentration of aluminum, chlorine or arsenic in the formations is usually approximately known in advance of drilling, one may add to the mud either a higher concentration of one or more of these same elements or use different ones to distinguish the mud from its surrounding formation.

Fig. 2 shows a neutron log obtained after a well has been drilled using a mud of the type here indicated. Curve 12 shows how the induced gamma ray activity varies down the hole. Assuming that the zero of the chart is on the left-hand edge, it is seen that formation 3 produces a larger effect than formation 2. At the point 15 where the neutrons meet the additive in the mud, a large increase in activity is obtained and is indicated on the log at point 14. This increase to the large value 18 is due to the induced activity of the tracer material which has been added to the mud, and by this increase in gamma ray activity any residual mud film may be detected. At the point 17 below which the mud cake is absent there is a return to the normal neutron log indication of the formations as indicated by the decrease 16 on Fig. 2.

The compounds of elements aluminum, chlorine or arsenic used may be any of a great variety. Other elements may also be used, it being merely necessary that the element should on neutron bombardment emit gamma rays of sufficiently short wave length to pass through the mud and enter the detecting apparatus. Preferably they are added to the mud in suspension form so that they will remain in the mud and not be leached out by washing operations. Chemical compositions between constituents of the mud and the added aluminum, chlorine or arsenic would in no means interfere with the practice of this invention.

What we claim is:

1. The method of locating the level of mud film on the walls of a borehole which comprises adding to the drilling mud before drilling a tracer constituent in sufficient concentration to produce when bombarded with neutrons an identifiable gamma ray intensity higher than that of the formations to be penetrated, said tracer constituent comprising the chemical element aluminum, bombarding a portion of the wall of the borehole with neutrons, simultaneously measuring at said portion the gamma ray intensity inside the borehole and measuring the depth of said portion of the borehole.

2. The method of locating the level of mud film on the walls of a borehole which comprises adding to the drilling mud before drilling an insoluble tracer constituent in sufficient concentration to produce when bombarded with neutrons an identifiable gamma ray intensity higher than that of the formations to be penetrated, said tracer constituent comprising the chemical element chlorine, bombarding a portion of the wall of the borehole with neutrons, simultaneously measuring at said portion the gamma ray intensity inside the borehole and measuring the depth of said portion of the borehole.

3. The method of locating the level of mud film on the walls of a borehole which comprises adding to the drilling mud before drilling a tracer constituent in sufficient concentration to produce when bombarded with neutrons an identifiable gamma ray intensity higher than that of the formations to be penetrated, said tracer constituent comprising the chemical element arsenic, bombarding a portion of the wall of the borehole with neutrons, simultaneously measuring at said portion the gamma ray intensity inside the borehole and measuring the depth of said portion of the borehole.

4. The method of locating the level of mud film on the walls of a borehole which comprises adding to the drilling fluid before drilling an insoluble tracer constituent in sufficient concentration to produce when bombarded with neutrons an identifiable gamma ray intensity higher than that of the formations to be penetrated, bombarding the wall of the borehole with neutrons at a known level, simultaneously measuring at said level the gamma ray intensity inside the borehole and measuring the depth of said level of measurement.

MORRIS MUSKAT.
NORMAN D. COGGESHALL.

(References on following page)

REFERENCES CITED

The following references are of record in the file of this patent:

UNITED STATES PATENTS

| Number | Name | Date |
|---|---|---|
| 2,231,577 | Hare | Feb. 11, 1941 |
| 2,303,688 | Fearon | Dec. 1, 1942 |
| 2,339,129 | Albertson | Jan. 11, 1944 |
| 2,349,712 | Fearon | May 23, 1944 |
| 2,364,975 | Heigl | Dec. 12, 1944 |
| 2,443,680 | Herzog | June 22, 1948 |

OTHER REFERENCES

Livingood and Seaborg, Reviews of Modern Physics, January, 1940, vol. 12, pp. 30–43.